United States Patent
Jun (10) Patent No.: US 9,945,743 B2
(45) Date of Patent: Apr. 17, 2018

(54) TORQUE SENSOR DEVICE

(71) Applicant: LS AUTOMOTIVE CORP, Ansan-si, Gyeonggi-do (KR)

(72) Inventor: Chang Nam Jun, Suwon-si (KR)

(73) Assignee: LS AUTOMOTIVE TECHNOLOGIES CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 15/508,636

(22) PCT Filed: Sep. 4, 2015

(86) PCT No.: PCT/KR2015/009343
§ 371 (c)(1),
(2) Date: Mar. 3, 2017

(87) PCT Pub. No.: WO2016/036186
PCT Pub. Date: Mar. 10, 2016

(65) Prior Publication Data
US 2017/0276558 A1    Sep. 28, 2017

(30) Foreign Application Priority Data

Sep. 5, 2014  (KR) .................. 10-2014-0119319

(51) Int. Cl.
*G01L 3/02* (2006.01)
*G01L 3/10* (2006.01)
(Continued)

(52) U.S. Cl.
CPC ............... *G01L 3/104* (2013.01); *B62D 6/10* (2013.01); *G01L 5/221* (2013.01); *B62D 5/04* (2013.01); *G01L 25/003* (2013.01)

(58) Field of Classification Search
CPC ....... G01L 25/003; G01L 5/221; G01L 3/104; B62D 5/04; B62D 6/10
(Continued)

(56) References Cited

U.S. PATENT DOCUMENTS

2005/0172732 A1* 8/2005 Feng ............... G01D 5/145
                                                   73/862.332
2011/0036182 A1   2/2011 Sasanouchi et al.
(Continued)

FOREIGN PATENT DOCUMENTS

KR   10-0983963 B1   9/2010
KR   10-1020420 B1   3/2011
(Continued)

*Primary Examiner* — Max Noori
(74) *Attorney, Agent, or Firm* — Rabin & Berdo, P.C.

(57) ABSTRACT

Provided is a torque sensor device to detect a torque between an input shaft and an output shaft through a relative rotation displacement therebetween. The torque sensor device includes: a housing to accommodate an end of the input shaft and an end of the output shaft: a magnet unit including a magnet block fixed in position to the housing; a collector unit including a collector disposed between the input shaft and the magnet block and between the output shaft and the magnet block in the radial directions of the input shaft and the output shaft to be partially rotatably connected to each of the input shaft and the output shaft, the collector focusing a magnetic field generated from the magnet unit; and a sensing unit including a torque sensor disposed at the outer circumference of the collector unit and detecting the magnetic field focused by the collector unit.

5 Claims, 5 Drawing Sheets

(51) Int. Cl.
   *G01L 5/22*   (2006.01)
   *B62D 6/10*   (2006.01)
   *B62D 5/04*   (2006.01)
   *G01L 25/00*   (2006.01)

(58) Field of Classification Search
   USPC .................................................. 73/862, 193
   See application file for complete search history.

(56) References Cited

U.S. PATENT DOCUMENTS

2012/0260746 A1    10/2012  Lee
   2014/0283623 A1     9/2014  Song
   2015/0300898 A1*   10/2015  Lee ......................... G01L 3/104
                                                              73/862.325
   2017/0276557 A1*    9/2017  Jun ......................... G01L 3/104

FOREIGN PATENT DOCUMENTS

KR    10-2012-0117294 A    10/2012
   KR    10-2013-0063214 A     6/2013

* cited by examiner

TORQUE SENSOR DEVICE

TECHNICAL FIELD

The present invention relates to a torque sensor, and more particularly, to a torque sensor for detecting a torque applied to a shaft including an input shaft and an output shaft.

BACKGROUND ART

In general, a vehicle wheel which is in contact with a road surface rotates according to a rotation of a steering wheel during traveling or stopping of a vehicle. In other words, when the steering wheel rotates to the left or right, the vehicle wheel rotates in the same direction as the rotation direction of the steering wheel. However, there may be a problem in that because the vehicle wheel is in contact with the road surface, the rotation amounts of the steering wheel and the vehicle wheel become different from each other due to a friction generated between the vehicle wheel and the road surface. For this reason, a driver needs a large force to manipulate the steering wheel.

The vehicle includes a power steering (PS) system as a steering force auxiliary device. In the power steering system, the coverage of an EPS scheme using an electric motor is being expanded in a passenger vehicle used in a real life.

For the purpose of power assistance, the power steering system is provided with a torque sensor that measures a deviation in the rotation angle between an input shaft side connected to the steering wheel and an output shaft side connected to the vehicle wheels in order to detect a torque load between the both shafts.

The torque sensor is largely divided into a contact type and a contactless type. Because the contact type entails a problem in that a noise is generated and durability is reduced, the contactless type has been preferred recently. In addition, the contactless type torque sensor is roughly classified into a magnetic resistance detection type, a magnetic deformation detection type, a capacitance detection type, and an optical detection type.

Meanwhile, a conventional magnetic resistance detection type torque sensor, which is provided in an electric power steering system, includes an input shaft whose upper end is coupled to the steering wheel manipulated by a driver and an output shaft whose upper end is coupled to a lower end of the input shaft through a torsion bar. A lower end of the output shaft is connected to a vehicle wheel. The lower end of the input shaft including the torsion bar and the upper end of the output shaft are covered by a housing, which has accommodated therein the torque sensor and the power means as described above. In this case, the input shaft includes a permanent magnet whose magnetic polarities are alternately arranged at regular intervals. Also, the output shaft is provided with a detection ring having a gear structure of which number of polarities correspond to the number of polarities of the permanent magnet and which is made of a ferromagnetic substance that can generate a magnetic induction caused by the permanent magnet included in the input shaft. The detection ring is constructed such that a sensor for detecting magnetism is connected thereto. In this case, a relative twist between the permanent magnet provided at the input shaft and the detection ring of the gear structure provided at the output shaft causes a change in area where the permanent magnet and the detection ring face each other. Accordingly, a magnetic flux is changed in the detection ring and the change of the magnetic flux is detected by the sensor so that a twist angle of the output shaft relative to the input shaft can be detected.

However, the conventional contactless type torque sensor encounters problems in that an excessive number of constituent elements are required and an assembly process is complicated, thus leading to increases in the possibility of erroneous operation and the manufacturing cost, and to an exposure of a problem associated with durability period of the torque sensor due to the excessive number of constituent elements.

DISCLOSURE OF INVENTION

Technical Problem

Accordingly, the present invention has been made to solve the above-mentioned problems occurring in the prior art, and it is an object of the present invention to provide a torque sensor device which can be manufactured with a simple structure, can increase sensitivity and detection reliability, and can reduce the manufacturing cost.

Technical Solution

To achieve the above object, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit including a magnet block accommodated in the housing in such a manner as to be fixed in position to the housing; a collector unit including a collector at least partially disposed between the input shaft and the magnet block and between the output shaft and the magnet block in the radial directions of the input shaft and the output shaft in such a manner as to be partially rotatably connected to each of the input shaft and the output shaft, the collector being configured to focus a magnetic field generated from the magnet unit; and a sensing unit including a torque sensor disposed at the outer circumference of the collector unit and configured to detect the magnetic field focused by the collector unit. The collector unit includes: an upper collector connected to the input shaft so as to rotate together with the input shaft; a lower collector connected to the output shaft so as to rotate together with the output shaft; and a fixing collector fixed in position to the housing in such a manner as to be disposed spacedly on the outer circumferences of the upper collector and the lower collector with the torque sensor interposed between respective one ends of the fixing collector, and wherein the magnet block has different polarities in the axial longitudinal direction of the input shaft and the output shaft.

In the torque sensor device, the upper collector may include: an upper collector ring formed in the rotational direction of the input shaft; and an upper collector tooth array composed of a plurality of upper collector teeth which are formed extending toward the output shaft in the longitudinal direction of the input shaft from the circumferential end of the upper collector ring in such a manner as to be circumferentially spaced apart from each other at equal angular intervals. The lower collector may include: a lower collector ring formed in the rotational direction of the output shaft; and a lower collector tooth array composed of a plurality of lower collector teeth which are formed extending toward the input shaft in the longitudinal direction of the output shaft from the circumferential end of the lower collector ring in such a manner as to be circumferentially spaced apart from each other at equal angular intervals. If there is no relative rotation between the input shaft and the output shaft, the upper collector tooth array and the lower collector tooth array may be overlapped on each other when projected onto a plane perpendicular to the input shaft and the output shaft.

In the torque sensor device, the magnet block may be an arcuate-shaped structure.

In the torque sensor device, the fixing collector may include: an upper fixing collector including an upper fixing plate disposed at the outer circumference of the upper collector and an upper fixing terminal formed extending toward the torque sensor from the outer circumferential end of the upper fixing plate; and a lower fixing collector including a lower fixing plate disposed at the outer circumference of the lower collector and a lower fixing terminal formed extending toward the torque sensor from the outer circumferential end of the lower fixing plate.

In the torque sensor device, a distance between the magnet block and the upper collector and the lower collector may be smaller than a distance between the magnet block and the torque sensor on a radius of rotation of the input shaft and the output shaft.

Advantageous Effects

The torque sensor device according to the embodiments of the present invention as constructed above have the following advantageous effects.

First, the torque sensor device of the present invention can improve assemblability through a position fixing structure of the magnet and prevent waste of materials, thus leading to a reduction in the manufacturing cost of the device.

Second, the torque sensor device of the present invention can achieve a more simple and accurate detection of the torque through a structure in which the upper collector and the lower collector are arranged to be opposite to each other.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Hereinafter, the configuration and operation of a torque sensor device 10 of the present invention will be described in detail with reference to the accompanying drawings.

Figure 1:
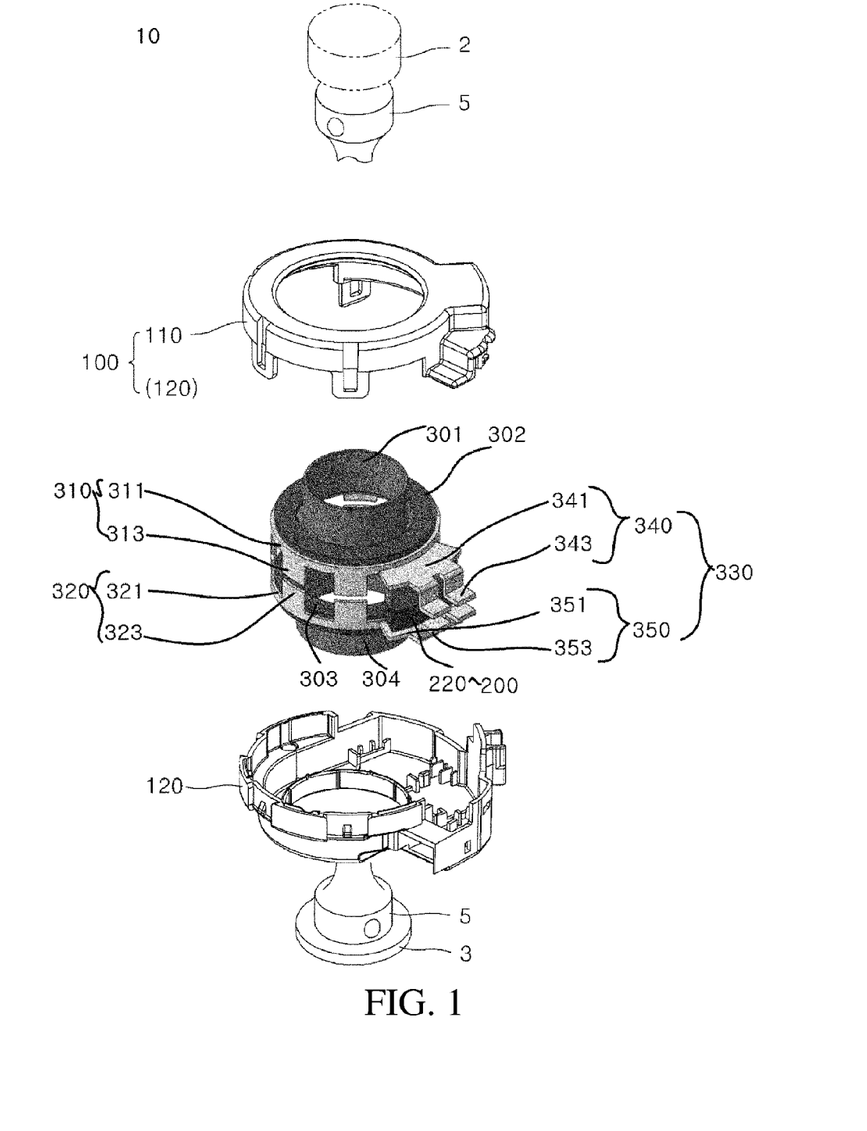
FIG. 1 is a schematic exploded perspective view showing a torque sensor device according to an embodiment of the present invention.

The torque sensor device 10 of the present invention includes a housing 100, a magnet unit 200, a collector unit 300, and a sensing unit 400. The torque sensor device 10 of the present invention is disposed between an input shaft 2 and an output shaft 3 and detects a torque between the input shaft 2 and the output shaft 3 through a relative rotation displacement therebetween.

The housing 100 accommodates an end of the input shaft 2 and an end of the output shaft 3 and is fixed in position to be able to perform a relative rotation with respect to the input shaft 2 and the output shaft 3.

The housing 100 includes a housing cover 110 and a housing base 120. The housing cover 110 is engaged with the housing base 120 to define an internal space that accommodates other constituent elements.

The housing cover 110 is disposed at the input shaft, and the housing base 120 is disposed at the output shaft 3 so as to confront the housing cover 110. The housing cover 110 includes a housing cover mounting part (not shown) formed at the outer circumference thereof, and the housing base 120 includes a housing cover mounting part (not shown) formed at the outer circumference thereof to form a mutual engagement structure.

The housing cover 110 and the housing base 120 include a through-opening 113 and a through-opening (not shown), respectively, so that the input shaft 2 and the output shaft 3 and a torsion bar 5 for directly interconnecting the input shaft 2 and the output shaft 3 can be penetratingly disposed therein.

The magnet unit 200 is accommodated in the housing 100 in such a manner as to be fixed in position to the housing 100. In other words, the magnet unit forms a structure in which it does not rotate relative to the housing, but is fixed in position to the housing. The magnet unit may be configured in various manners, but in this embodiment, the magnet unit 200 includes a magnet block 220.

In this embodiment, the magnet block is provided in single number, but is not limited thereto. Although not shown in this embodiment, the magnet unit may include a magnet holder fixedly mounted to the inner side of the housing 100 to take a configuration in which the magnet holder supports the magnet block 220. The magnet block 220 of the present invention forms a structure in which different polarities are arranged in the axial longitudinal directions of the input shaft 2 and the output shaft 3, i.e., N and S poles or S and N poles are arranged or arranged to be magnetized in the axial longitudinal directions of the input shaft 2 and the output shaft 3.

The collector unit 300 forms a structure in which it is accommodated in the housing 100 in such a manner as to be at least partially connected to each of the input shaft 2 and the output shaft 3 with respect to the housing 100 so as to rotate together with the input shaft 2 and the output shaft 3.

In addition, the collector unit 300 is at least partially disposed between the input shaft 2 and the magnet block 220 and the output shaft 3 and the magnet ring 220 in a radial direction of the input shaft 2 and the output shaft 3 so that the collector unit 300 forms a magnetic path of the magnetic field formed at the magnet block 220 of the magnet unit 200 or focuses the magnetic field for transfer to the sensing unit 400 to achieve a more accurate detection function.

The sensing unit 400 is implemented as a torque sensor that is disposed at the outer circumference of the collector unit 300 and detects the magnetic field focused by the collector unit 300. The sensing unit 400 may include a contactless type sensor such as a hall sensor. The sensing unit 400 may further include a separate sensor, if necessary.

In this embodiment, the sensing unit takes a configuration in which it includes a pair of torque sensors to improve the accuracy of sensitivity and implement a fail-safe function through a signal outputted from one of the torque sensors when the other fails, but may take a configuration in which it includes a single torque sensor, if necessary.

Meanwhile, the collector unit 300 of the present invention includes an upper collector 310, a lower collector 320 and a fixing collector 330.

The upper collector 310 is connected to the input shaft so as to rotate together with the input shaft.

An upper collector sleeve 301 and an upper collector holder 302 may be provided between the upper collector 310 and the input shaft 2. The upper 301 collector sleeve is connected at one end thereof to the input shaft 2. The connection between the upper collector sleeve 301 and the input shaft 2 can be achieved in various coupling manners such as welding, plastic snap-fitting, and caulking within a range of preventing a relative rotation therebetween.

In addition, the upper collector sleeve 301 may be modified in various manners such as being implemented as a steel structure or a synthetic resin structure.

Further, the upper collector holder 302 is connected to the outer circumference of the upper collector sleeve 301. The upper collector holder 302 is a constituent element that interconnects the upper collector sleeve 301 and the upper collector 310, and ultimately implements a connection function of preventing a relative rotation between the input shaft and the upper collector 310.

The upper collector 310 includes an upper collector ring 311 and an upper collector tooth array 313.

The upper collector ring 311 has a predetermined annular shape formed in the rotational direction of the input shaft 2. The upper collector tooth array 313 is composed of a plurality of lower collector teeth which are formed extending toward the output shaft 3 in the longitudinal direction of the input shaft 2 from a circumferential end of the upper collector ring 311 so as to be circumferentially spaced apart from each other at equal angular intervals.

In addition, the lower collector 320 is connected to the output shaft so as to rotate together with the output shaft.

A lower collector sleeve 303 and a lower collector holder 304 may be provided between the lower collector 320 and the output shaft 3. This connection structure of the lower collector is the same as that of the upper collector as described above, but may take a different configuration, if necessary. The lower collector sleeve 303 is connected at one end thereof to the output shaft 3. The connection between the lower collector sleeve 303 and the output shaft 3 can be achieved in various coupling manners such as welding, plastic snap-fitting, and caulking within a range of preventing a relative rotation therebetween.

In addition, the lower collector sleeve 303 may be modified in various manners such as being implemented as a steel structure or a synthetic resin structure.

Further, the lower collector holder 304 is connected to the outer circumference of the lower collector sleeve 303. The lower collector holder 304 is a constituent element that interconnects the lower collector sleeve 303 and the lower collector 320, and ultimately implements a connection function of preventing a relative rotation between the input shaft and the lower collector 320.

The lower collector 320 includes a lower collector ring 321 and a lower collector tooth array 323.

The lower collector ring 321 has a predetermined annular shape formed in the rotational direction of the output shaft 3. The lower collector tooth array 323 is composed of a plurality of lower collector teeth which are formed extending toward the input shaft 2 in the longitudinal direction of the output shaft 3 from a circumferential end of the lower collector ring 321 so as to be circumferentially spaced apart from each other at equal angular intervals.

Figure 2:
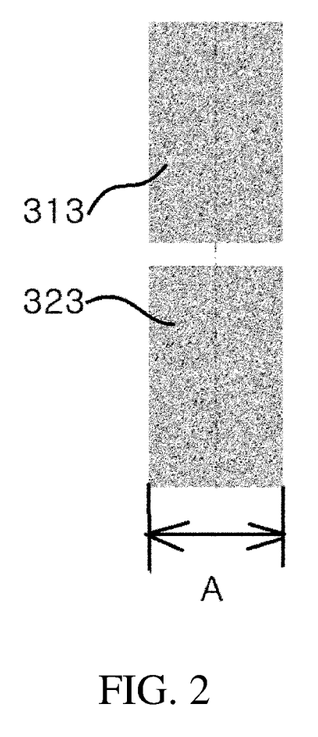
FIG. 2 is a schematic partial side view showing upper and lower collector teeth when there is no torsion of a torque sensor according to an embodiment of the present invention.

In the meantime, in the case where there is no relative rotation between the input shaft 2 and the output shaft 3, i.e., the input shaft 2 and the output shaft 3 rotate together in the same rotational speed without any torsion of a torsion bar, or in the case where the input shaft 2 and the output shaft 3 is not applied with an external force but is in a stationary state, the upper collector tooth array 313 and the lower collector tooth array 323 takes a structure in which when the respective upper and lower collector tooth arrays is projected onto a plane perpendicular to the input shaft 2 and the output shaft 3, i.e., a virtual plane (not shown) formed the upper collector 310 and the lower collector 320, the regions of the respective two collector tooth arrays are overlapped on each other to occupy nearly the same region A (see FIG. 2).

Figure 4:
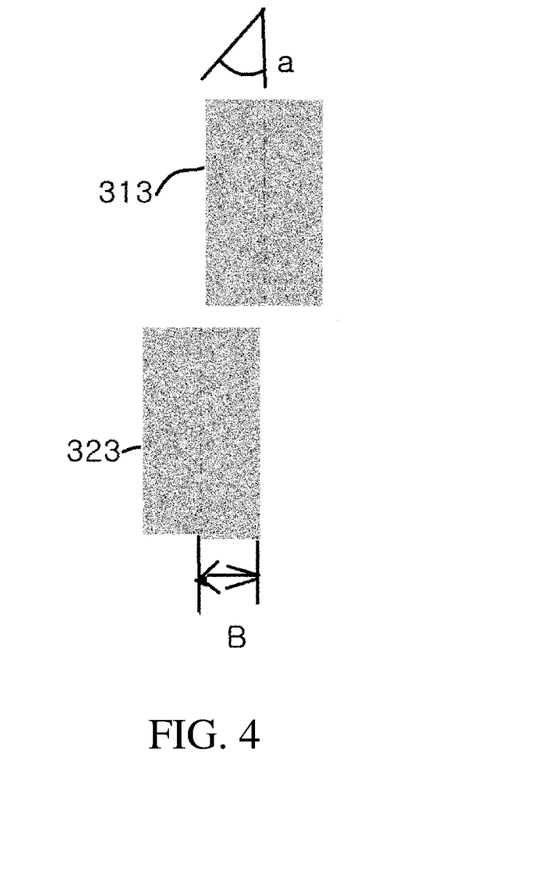
FIG. 4 is a schematic partial side view showing upper and lower collector teeth when there occurs a torsion of a torque sensor according to an embodiment of the present invention.

On the contrary, in the case where there occurs a predetermined angular displacement, i.e., any torsion between the input shaft and the output shaft, there occur non-overlapped regions between the respective two collector tooth arrays and thus an overlapped region B between the respective two collector tooth arrays is smaller than the region A of the aforementioned case.

In the meantime, the fixing collector 330 are fixed in position to the housing in such a manner as to be disposed spacedly on the outer circumferences of the upper collector 310 and the lower collector 320 with the torque sensor 400 interposed between respective one ends of the fixing collector.

The fixing collector 330 includes an upper fixing collector 340 and a lower fixing collector 350.

The upper fixing collector 340 includes an upper fixing plate 341 and an upper fixing terminal 343.

The upper fixing plate 341 is formed at the outer circumference of the upper collector 310, and the upper fixing terminal 343 is formed so as to extend from the outer circumferential end of the upper fixing plate 341 toward the torque sensor 400.

The upper fixing plate 341 is formed at the outer circumference of the upper collector 310, and the upper fixing terminal 343 is formed so as to extend from the outer circumferential end of the upper fixing plate 341 toward the torque sensor 400. The upper fixing terminal 343 has a predetermined bent shape so that an end of the upper fixing terminal 343 approaches the torque sensor 400 to reduce an air gap, thereby increasing a transferability of the focused magnetic flux to the torque sensor 400 to achieve a more accurate detection of the torque.

The upper fixing plate 341 and the upper fixing terminal 343 are formed integrally with each other. One end of the upper fixing plate 341 is disposed in proximity to the upper collector 310, and an end of the upper fixing terminal 343 disposed in proximity to the torque sensor 400 so as to be opposite to the upper collector.

The lower fixing collector 350 includes a lower fixing plate 351 and a lower fixing terminal 353. The entire structure of the lower fixing collector 350 is the same as that of the upper fixing collector 340, but may take a configuration that is slightly different from that of the upper fixing collector 340, if necessary.

The lower fixing plate 351 is formed at the outer circumference of the lower collector 320. The lower fixing terminal 353 is formed so as to extend from the outer circumferential end of the lower fixing plate 351 toward the torque sensor 400. The lower fixing terminal 353 has a predetermined bent shape so that an end of the lower fixing terminal 353 approaches the torque sensor 400 to reduce an air gap, thereby increasing a transferability of the focused magnetic flux to the torque sensor 400 to achieve a more accurate detection of the torque.

The lower fixing plate 351 and the lower fixing terminal 353 are formed integrally with each other. One end of the lower fixing plate 351 is disposed in proximity to the lower collector 320, and the an end of the lower fixing terminal 353 disposed in proximity to the torque sensor 400 so as to be opposite to the lower collector 320.

Figure 3:
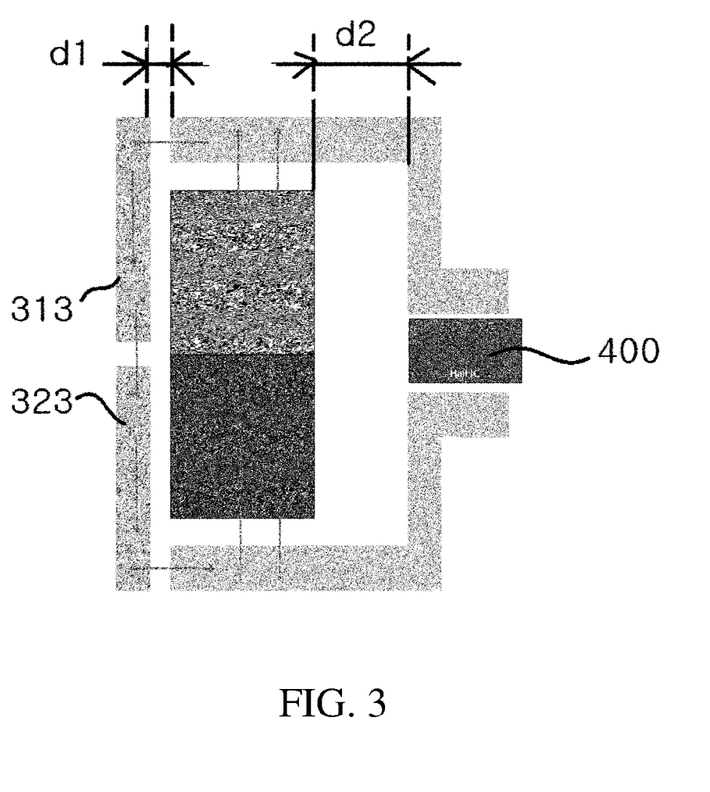
FIG. 3 is a partial side cross-sectional view showing a collector unit and a sensing unit in the case of FIG. 2.

Meanwhile, a distance d1 between the magnet block 220 and the upper collector 310 and the lower collector 320 is smaller than a distance d2 between the magnet block 220 and the torque sensor 400 on a radius of rotation of the input shaft 2 and the output shaft 3.

In other words, a gap between the upper and lower fixing plates 341 and 351 and the upper and lower collectors 310 and 320 is indicated by a reference symbol d1, and a gap between the magnet block 220 formed in an arcuate shape and the torque sensor 400 or between the magnet block 220 and the vertical inner wall surfaces of the upper fixing terminal 343 and the lower fixing terminal 353 is indicated by a reference symbol d2 such that a relationship of d2>>d1 is established. By virtue of such a configuration, when the upper collector tooth array and the lower collector tooth array closely approach each other, a magnetic circuit as shown in FIG. 3 is formed, and the torque sensor detects a signal of a signal of a predetermined magnitude by a repeated continuous rotation of the input shaft and the output shaft.

Figure 5:
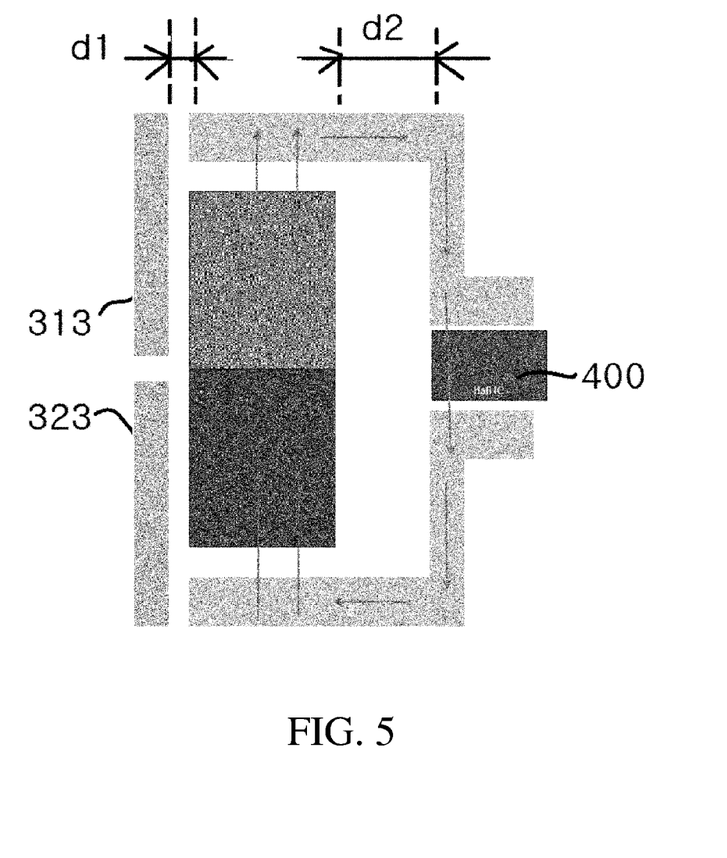
FIG. 5 is a partial side cross-sectional view showing a collector unit and a sensing unit in the case of FIG. 4.

On the other hand, as shown in FIG. 4, when there occurs a torsion between the input shaft and the output shaft, an overlapped region between the upper collector tooth array and the lower collector tooth array is reduced so that a magnetic circuit is formed around the torque sensor as shown in FIG. 5 rather than the formation of the magnetic circuit in the aforementioned case. As a result, the detection of a signal different from the signal in aforementioned case is achieved so that a torque value caused by a predetermined torsion can be calculated.

As described above, the present invention can be modified in various manners within a range of detecting a torque applied to a shaft through a contactless type torque sensor and a change in the overlapped region between the upper and lower collector tooth arrays.

INDUSTRIAL APPLICABILITY

The present invention can be utilized in a variety of industrial and technical fields, such as being implemented as a torque sensor for an electric bicycle or an electric motorcycle besides a steering wheel shaft for a motor vehicle within a range of detecting a torque applied to a shaft through a contactless type torque sensor.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

The invention claimed is:

1. A torque sensor device disposed between an input shaft and an output shaft and configured to detect a torque between the input shaft and the output shaft through a relative rotation displacement therebetween, the torque sensor device comprising:

a housing configured to accommodate an end of the input shaft and an end of the output shaft and fixed in position to be able to perform a relative rotation with respect to the input shaft and the output shaft:

a magnet unit including a magnet block accommodated in the housing in such a manner as to be fixed in position to the housing;

a collector unit including a collector at least partially disposed between the input shaft and the magnet block and between the output shaft and the magnet block in the radial directions of the input shaft and the output shaft in such a manner as to be partially rotatably connected to each of the input shaft and the output shaft, the collector being configured to focus a magnetic field generated from the magnet unit; and a sensing unit including a torque sensor disposed at the outer circumference of the collector unit and configured to detect the magnetic field focused by the collector unit, wherein the collector unit comprises:

an upper collector connected to the input shaft so as to rotate together with the input shaft;

a lower collector connected to the output shaft so as to rotate together with the output shaft; and a fixing collector fixed in position to the housing in such a manner as to be disposed spacedly on the outer circumferences of the upper collector and the lower collector with the torque sensor interposed between respective one ends of the fixing collector, and wherein the magnet block has different polarities in the axial longitudinal direction of the input shaft and the output shaft.

2. The torque sensor device according to claim 1, wherein the upper collector comprises:

an upper collector ring formed in the rotational direction of the input shaft; and an upper collector tooth array composed of a plurality of upper collector teeth which are formed extending toward the output shaft in the longitudinal direction of the input shaft from the circumferential end of the upper collector ring in such a manner as to be circumferentially spaced apart from each other at equal angular intervals, wherein the lower collector comprises:

a lower collector ring formed in the rotational direction of the output shaft; and a lower collector tooth array composed of a plurality of lower collector teeth which are formed extending toward the input shaft in the longitudinal direction of the output shaft from the circumferential end of the lower collector ring in such a manner as to be circumferentially spaced apart from each other at equal angular intervals, and wherein if there is no relative rotation between the input shaft and the output shaft, the upper collector tooth array and the lower collector tooth array are overlapped on each other when projected onto a plane perpendicular to the input shaft and the output shaft.

3. The torque sensor device according to claim 2, wherein the magnet block is an arcuate-shaped structure.

4. The torque sensor device according to claim 2, wherein the fixing collector comprises:

an upper fixing collector comprising an upper fixing plate disposed at the outer circumference of the upper collector and an upper fixing terminal formed extending toward the torque sensor from the outer circumferential end of the upper fixing plate; and a lower fixing collector comprising a lower fixing plate disposed at the outer circumference of the lower collector and a lower fixing terminal formed extending toward the torque sensor from the outer circumferential end of the lower fixing plate.

5. The torque sensor device according to claim 4, wherein a distance between the magnet block and the upper collector and the lower collector is smaller than a distance between the magnet block and the torque sensor on a radius of rotation of the input shaft and the output shaft.

* * * * *